United States Patent [19]

Katamoto et al.

[11] Patent Number: 4,917,952

[45] Date of Patent: Apr. 17, 1990

[54] ELECTROCONDUCTIVE IRON OXIDE PARTICLES

[75] Inventors: Tsutomu Katamoto; Tokihiro Kurata; Nanao Horiishi, all of Hiroshima, Japan

[73] Assignee: Toda Kogyo Corp., Hiroshima, Japan

[21] Appl. No.: 248,986

[22] Filed: Sep. 26, 1988

[30] Foreign Application Priority Data

Sep. 29, 1987 [JP] Japan .................................. 62-244594
Oct. 23, 1987 [JP] Japan .................................. 62-269051
Aug. 25, 1988 [JP] Japan .................................. 62-211436
Aug. 25, 1988 [JP] Japan .................................. 62-211437

[51] Int. Cl.$^4$ ............................................... B32B 5/30
[52] U.S. Cl. ............................. 428/403; 428/402.24; 428/404; 428/928; 428/937; 252/519
[58] Field of Search ............... 428/403, 404, 405, 329, 428/928, 937, 402.24; 252/519

[56] References Cited

U.S. PATENT DOCUMENTS 4,389,451  6/1983  Fujioka et al. ...................... 428/328
4,457,973  7/1984  Matsui et al. ....................... 428/372
4,655,966  4/1987  Guillaumon et al. ............... 252/518

Primary Examiner—George F. Lesmes
Assistant Examiner—Chris Brown
Attorney, Agent, or Firm—Nixon & Vanderhye

[57] ABSTRACT

Disclosed herein are electroconductive iron oxide particles having a volume resistivity less than $5 \times 10^6$ Ω-cm, and comprising iron oxide particles selected from hematite and maghemite, and $SnO_2$ particles containing Sb as a solid solution deposited on the surfaces of the iron oxide particles, and a process for producing the same.

14 Claims, 2 Drawing Sheets

ELECTROCONDUCTIVE IRON OXIDE PARTICLES

BACKGROUND OF THE INVENTION:

The present invention relates to electroconductive iron oxide particles having excellent stability and electroconductivity, and assuming a reddish to dark purple, liver brown or golden yellow color, and a process for producing such electroconductive iron oxide particles. More particularly, the present invention relates to electroconductive iron oxide particles having a volume resistivity of not more than $5 \times 10^6 \Omega$-cm, and comprising iron oxide particles selected from hematite and maghemite, and $SnO_2$ particles in which Sb is contained as a solid solution deposited on the surfaces of the iron oxide particles, and a process for producing such electroconductive iron oxide particles which comprises stirring an aqueous suspension containing iron oxide particles selected from hematite and maghemite, and Sb-containing $SnO_2$ hydrate ($SnO_2 \cdot 2H_2O$) [hereinafter referred to as $SnO_2$ hydrate] particles so that the Sb-containing $SnO_2$ hydrate particles are deposited on the surface of the iron oxide particles, subjecting the thus deposited iron oxide particles to filtration, washing with water and drying, and then calcining the thus obtained iron oxide particles at a temperature of 400° to 800° C.

The electroconductive iron oxide particles according to the present invention are particularly useful as an antistatic material.

Recently, use of a clean room is prevailing for the assurance of safety, hygienic working atmosphere and precision of works In order to minimize dust in such clean room, antistatic materials are being used for the room. Application of antistatic materials is also required for preventing discharge break of IC's and LSI's Generally, an antistatic material is produced by dispersing the particles of an electroconductive substance in a base material such as coating material, rubber, plastic, etc., to afford electroconductivity to such material In the production of such antistatic material, it is necessary that the electroconductive substance applied on the base material does not lower the properties of the base material. This requires that the particles of the electroconductive substance to be dispersed in the base material have per se high electroconductivity so that they can afford the desired conductivity to the base material with as small a content as possible. This fact is described in many literatures, for example, "The 24th Pigment Engineering Seminar—Conductive materials and Their Applications" (1986) held under the joint auspices of the Kanto branch of Journal of the Japan Society of Colour Material, the Pigment Technology Research Society and the Kanto branch of the Japan Pigment Technology Association, which states on pages 1-19: " ... the properties required for the conductive fillers are shown in FIG. 2. Needless to say, there are required those fillers which show the desired conductivity with a small content and deteriorate the resin properties."

The electroconductive material particles are also required to be highly resistant to the acid(s) in the vehicle in the production of coating material, etc., and to have excellent weather resistance so as not to cause environmental pollution. This fact is also described in the above-mentioned literature, "the properties, . . . , stability, . . . of the preferred fillers" with reference to "FIG. 2".

On the other hand, the improvements of cultural and social life standards in the recent years have raised the requirements for not only the improvement of functional qualities of commodities but also greater variety of their appearance from the sensory and fashionable aspects. Concerning color, for instance, there is strong request for a larger variety of colors, especially for the beautiful chromatic colors.

Various kinds of conductive material particles are now available. For instance, carbon particles such as a carbon black powder, metal particles such as a copper powder, an aluminum powder, a nickel powder, etc., reduced titanium oxide particles, mica particles coated with Sb-containing $SnO_2$ or $TiO_2$, metal oxide particles such as titanium oxide particles coated with $SnO_2$ containing Sb as a solid solution are known.

The conductive material particles having excellent stability and electroconductivity are the most strongly required at present. However, the presently available carbon particles, although excellent in stability, have the problems in the esthetic aspect because of their black color. While the metal particles obtainable from the conventional methods, although having excellent electroconductivity, are low in resistance to the acid(s) in the vehicle and also poor in weather resistance and stability. Further, the metal oxide particles, although high in stability, are unsatisfactory in electroconductivity. For example, the electric resistance of the iron oxide particles, which are the most typical example of the metal oxide pigment particles, is on the order of $10^8$ to $10^9$ $\Omega$-cm It is commonly practiced to reduce the metal oxide particles or coat the metal oxide particles with various kinds of material for giving electroconductivity to such particles. However, all of the available metal oxide type conductive material particles are white or of an achromatic color ranging from gray to black.

Thus, the establishment of technical means for obtaining the electroconductive material particles having excellent stability and electroconductivity as well as a beautiful chromatic color other than black color has been strongly required.

As a result of the extensive studies for obtaining the conductive material particles having excellent stability and electroconductivity as well as a beautiful chromatic color, it has been found that by stirring and mixing up an aqueous suspension containing iron oxide particles selected from hematite and maghemite, and the Sb-containing $SnO_2$ hydrate particles so that said Sb-containing $SnO_2$ hydrate particles are deposited on the surfaces of said iron oxide particles, subjecting these iron oxide particles to filtration, washing with water and drying, and then calcining the thus obtained iron oxide particles at a temperature in the range of 400° to 800° C., thereby obtaining electroconductive iron oxide particles having a volume resistivity of not more than $5 \times 10^6$ $\Omega$-cm, and comprising iron oxide particles selected from hematite and maghemite, and $SnO_2$ particles in which Sb is contained as a solid solution deposited on the surface of the iron oxide particles. The present invention was attained on the basis of such finding.

SUMMARY OF THE INVENTION:

In a first aspect of the present invention, there is provided electroconductive iron oxide particles having a volume resistivity less than $5 \times 10^6$ $\Omega$-cm, and comprising iron oxide particles selected from hematite and maghemite, and $SnO_2$ particles containing Sb as a solid solution deposited on the surfaces of the iron oxide particles.

In a second aspect of the present invention, there is provided a process for producing electroconductive iron oxide particles having a volume resistivity less than $5 \times 10^6$ Ω-cm, and comprising iron oxide particles selected from hematite and maghemite and $SnO_2$ particles containing Sb as a solid solution deposited on the surfaces of the iron oxide particles, which process comprises stirring an aqueous suspension containing iron oxide particles selected from hematite and maghemite and Sb-containing $SnO_2$ hydrate particles so that the Sb-containing $SnO_2$ hydrate particles are deposited on the surfaces of said iron oxide particles, and then subjecting the thus obtained iron oxide particles to filtration, washing with water and drying, and then calcining the thus obtained iron oxide particles at a temperature in the range of 400° to 800° C.

Figure 1:
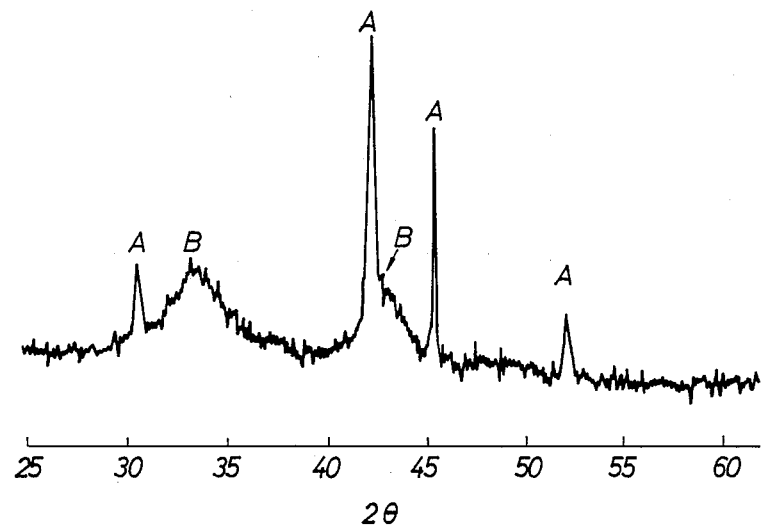
FIG. 1 is an X-ray diffraction pattern of a hematite particle depositing $SnO_2$ particles containing Sb as a solid solution phase, which was obtained in Example 1. In the diffraction pattern, peak A indicates hematite, and peak B indicates $SnO_2$.

DETAILED DESCRIPTION OF THE INVENTION:

The present invention provides electroconductive iron oxide particles having a volume resistivity of not more than $5 \times 10^6$ Ω-cm and comprising iron oxide particles selected from hematite and maghemite, and $SnO_2$ particles containing Sb as a solid solution deposited on the surfaces of the iron oxide particles, obtained by stirring and mixing up an aqueous suspension containing iron oxide particles selected from hematite and maghemite, and Sb-containing $SnO_2$ hydrate particles so that the Sb-containing $SnO_2$ hydrate particles are deposited on the surfaces of the iron oxide particles, and subjecting these iron oxide particles to filtration, washing with water and drying, and calcining the thus obtained iron oxide particles at a temperature in the range of 400° to 800° C. so that the $SnO_2$ particles containing Sb as a solid solution deposited on the surfaces of the iron oxide particles. There can be thereby obtained the electroconductive iron oxide particles assuming a reddish to dark purple, golden yellow or liver brown color, maintaining the color of the starting iron oxide particles.

Being an oxide, the electroconductive iron oxide particles according to the present invention have high resistance to the acid(s) in the vehicle used in the preparation of coating material, etc., and is also excellent in weather resistance so that it has little possibility of causing environmental pollution.

The electroconductive iron oxide particles according to the present invention is also characterized by a low electric resistance. The low electric resistance of the particle of the present invention may be accounted for by the following reasoning. The conbination of the size and shape of the starting iron oxide particles are properly selected so that when the Sb-containing $SnO_2$ hydrate particles are deposited on the iron oxide particles, the rate at which Fe in the iron oxide particles is dissolved by HCl generated in accordance with the hydrolysis of tin chloride or antimony chloride for forming the $SnO_2$ hydrate is minimized to allow deposition of the Sb-containing $SnO_2$ hydrate particles on the surfaces of the iron oxide particles. Also, by controlling the combination of the size and shape of the iron oxide particles, and the calcination temperature thereof, the solid phase dispersion of Fe in the iron oxide particles and Sb or Sn in Sb-containing $SnO_2$ in the course of calcination is prevented as much as possible to inhibit formation of a solid solution consisting of Fe, Sb and Sn, thereby allowing occurrence of the action and effect of Sn which contributes to the adjustment of electric charges and the formation of donor for making the particle electroconductive.

The iron oxide particles used in the present invention may take any form such as acicular, cubic, spherical, plate-like etc., preferably plate-like form. The acicular particles used in the present invention are ones having an average diameter (major axis) of 0.1 to 3.0μm, preferably 0.2 to 3.0μm, more preferably 0.3 to 0.7 μm and an axial ratio of 2 to 20, preferably 3 to 10, and the cubic or spherical particles used in the present invention are ones having an average diameter of 0.05 to 5.0 μm, preferably 0.1 to 5.0 μm, more preferably 0.2 to 1.0 μm.

When the average diameter of the particle is smaller than 0.05 μm, since the rate at which Fe in the iron oxide particles is dissolved increases to hinger, the deposition of the Sb-containing $SnO_2$ hydrate particle is difficult. The solid phase diffusion of Fe and Sb or Sn in the course of calcination is also promoted, making it unable to obtain the iron oxide particles having excellent electroconductivity, which is an object of the present invention.

Regarding the hematite used as starting material for producing the iron oxide particles of the present invention, the hematite particles having an average diameter of 0.3 to 0.4 μm assume usually reddish purple in color, and the hematite particles having an average diameter of 0.4 to 0.8 μm assume usually dark purple.

Especially the plate-like hematite particles may be either those occurring in nature or those obtained by the syntheses, having 0.5 to 100 μm in average diameter, 0.005 to 15 μm in thickness and 2:1–500:1 in aspect ratio.

The plate-like hematite particles having an average diameter of 0.5 to 100 μm, a thickness of 0.3 to 15 μm and an aspect ratio of 2:1 to 500:1 assume usually dark purple color.

The plate-like hematite particles of 0.5 to 100 μm in average diameter, 0.05 to 0.3 μm in thickness and 2:1 to 500:1 in aspect ratio assume usually reddish purple.

Especially in case of using the plate-like hematite particles having an average diameter of 0.5 to 5.0 μm, a thickness of 50 to 500 Å and an aspect ratio of 50:1 to 500:1, the obtained iron oxide particles assume a golden yellow color and have a lightness $L^*$ of not less than 30, a hue ($\theta = \tan^{-1} b^*/a^*$) of not less than 50° and a saturation $C^*$ (ab=$\sqrt{a^{*2}+b^{*2}}$) of not less than 17 (in the above formulae, $L^*$, $a^*$ and $b^*$ are the values given in the CIE 1976 ($L^*$, $a^*$, $b^*$) uniform sensory color space).

As the iron oxide particles in the present invention, there can be used those coated with an oxide layer containing Si, Ti or Si and Ti, obtained by adding an Si-containing compound, a Ti-containing compound or the mixture thereof to a suspension containing the starting iron oxide particles, stirring the resultant solution so that an oxide layer, hydroxide layer or hydrate layer containing Si, Ti or Si and Ti would be formed on the surface of each of the iron oxide particles, and subjecting the thus obtained iron oxide particles to filtration, washing with water and drying, and then calcining the thus obtained iron oxide particles at 400° to 800° C.

The electroconductive iron oxide particles comprising iron oxide particles coated with an oxide layer containing Si, Ti or Si and Ti, and an $SnO_2$ containing Sb as a solid solution deposited on the surface of the oxide layer containing Si, Ti or Si and Ti have a volume resistivity of not more than $5 \times 10^5$ Ω-cm. Such electroconductive iron oxide particles can be produced by adding an Si-containing compound, a Ti-containing compound or the mixture thereof to a suspension containing iron oxide particles selected from hematite and maghemite, stirring the resulting suspension so that an oxide layer, hydroxide layer or hydrate layer containing Si, Ti or Si and Ti is formed on the surface of each of the iron oxide particles, mixing the suspension containing the iron oxide particles having formed on their surfaces an oxide, hydroxide or hydrate layer containing Si, Ti or Si and Ti and an aqueous suspension containing the Sb-containing $SnO_2$ hydrate particles, stirring and mixing up the resultant suspension so that the Sb-containing $SnO_2$ hydrate particles are deposited on the surface of the oxide, hydroxide or hydrate layer containing Si, Ti or Si and Ti, subjecting these iron oxide particles to filtration, washing with water and drying, and then calcining the thus obtained iron oxide particles at a temperature in the range of 400° to 800° C.

In the case where the iron oxide particles coated with the oxide, hydroxide or hydrate layer containing Si, Ti or Si and Ti are used as a starting material, the deposition of the Sb-containing $SnO_2$ hydrate particles on the surfaces of the iron oxide particles can be accomplished at high efficiency even if the iron oxide particles are very fine, especially not more than 0.2μm, or even if the thickness of the plate-like hematite particles (in case of using hematite particles as iron oxide particles) is very small, especially not more than 500 Å, since the oxide, hydroxide or hydrate layer containing Si, Ti or Si and Ti has the effect of preventing the dissolution of Fe in the iron oxide particle by HCl generated in accordance with the hydrolysis of tin chloride or antimony chloride which is conducted for forming the $SnO_2$ hydrate.

The Sb-containing $SnO_2$ hydrate particles used in the present invention can be obtained by heating an alcohol solution or an aqueous solution of alcohol containing tin chloride ($SnCl_4$) and antimony chloride ($SnCl_3$) to not less than 70° C., preferably 70° to 75° C. to hydrolyze the tin chloride. As an alcohol, ethyl alcohol, isopropyl alcohol, isobutyl alcohol may be exemplified.

In the present invention, the aqueous suspension containing the iron oxide particles may be added and mixed with a separately prepared alcohol solution containing the Sb-containing $SnO_2$ hydrate particles, or an alcohol solution or an aqueous solution of alcohol containing tin chloride and antimony chloride may be added to the aqueous suspension containing the iron oxide particles maintained at not less than 70° C., preferably 70° to 75° C., thereby effecting the hydrolysis of tin chloride in the aqueous suspension to form and deposit the Sb-containing $SnO_2$ hydrate particles on the iron oxide particles.

In the present invention, deposition of the Sb-containing $SnO_2$ hydrate particles on the surfaces of the iron oxide particles can be effected by stirring and mixing up an aqueous suspension containing the iron oxide particles and the Sb-containing $SnO_2$ hydrate particles.

Very uniform and solid deposition of the Sb-containing $SnO_2$ hydrate particles on the surfaces of the iron oxide particles can be attained especially when the pH of the aqueous suspension is adjusted to the range of 3 to 12, preferably 6 to 8.

In the present invention, substantially the entirety of the Sb-containing $SnO_2$ hydrate particles added are deposited on the iron oxide particles.

As the Si-containing compound in the present invention, there can be used sodium silicate, potassium silicate, colloidal silica and the like. Such Si-containing compound is used for forming an Si-containing oxide layer on the surface of the iron oxide particle.

As the Ti-containing compound, there can be used titanium tetrachloride, titanyl oxysulfate and the like. In case of using titanium tetrachloride in an aqueous solution with a pH of not less than around neutral range, there is formed a Ti-containing hydroxide layer on the surface of the iron oxide particle, and in the case of using titanyl oxysulfate by hydrolyzing it in an aqueous solution at a temperature of not less than around 90° C., a Ti-containing hydrate layer is formed on the surface of the iron oxide particle.

In the present invention, substantially the entirety of the Si- or Ti-containing compound used is formed as an Si- or Ti- containing oxide, hydroxide or hydrate layer on the iron oxide particles.

In the present invention, the iron oxide particles having formed on their surfaces the specific oxide, hydroxide or hydrate layer may be calcined in the air by heating at a temperature of 200° to 1,000° C., preferably 300° to 600° C. This calcination provides a coating layer with better adhesiveness and turns the specific hydroxide or hydrate layer into an oxide layer.

In the process of the present invention, the calcination temperature of the iron oxide particles having deposited on their surfaces the Sb-containing $SnO_2$ hydrate particles is in the range of 400° to 800° C., preferably 500° to 600° C. By this calcination, the Sb-containing $SnO_2$ hydrate particles deposited on the surfaces of the iron oxide particles are turned into the $SnO_2$ particles containing Sb as a solid solution, and the electric resistance of the particles becomes not more than $5 \times 10^6$ Ω-cm. For preventing the solid phase dispersion of Fe and Sb or Sn in the course of calcination, the calcination temperature is lowered in accordance with the size of the iron oxide particles. In view of electric resistance, a temperature in the range of 500 to 600° C. is especially preferred for the calcination in the present invention.

The amount of Sb in the $SnO_2$ particles containing Sb as a solid solution in the process of the present invention is in the range of 0.1 to 40.0% by weight based on $SnO_2$ particles containing Sb as a solid solution. In view of electric resistance, the preferred amount of Sb is 4.0 to 12.0% by weight based on $SnO_2$ particles containing Sb as a solid solution.

The amount of $SnO_2$ particles containing Sb as a solid solution in the present invention is in the range of 5.0 to 200% by weight based on iron oxide particles. When the amount of $SnO_2$ particles containing Sb as a solid solution is less than 5% by weight, no desired electric resistance-reducing effect is provided, making it unable to attain the object of the present invention. Use of $SnO_2$ particles containing Sb as a solid solution in excess of 200% by weight, although allowing attainment of the object of the present invention, is meaningless as it can provide no extra effect. It is practically preferable to select the amount of $SnO_2$ particles containing Sb as a solid solution within the range of 10 to 100% by weight.

As to the amount of Si and the amount of Ti in the specific oxide layer, the amount of Si is 1 to 100% by weight, preferably 3 to 40% by weight (calculated as $SiO_2$) based on iron oxide particles, and the amount of Ti is 1 to 100 % by weight, preferably 3 to 40% by weight (calculated as $TiO_2$) based on iron oxide particles.

In case both of Si and Ti are contained in the specific oxide layer, the combined amount thereof (Si +Ti) is 1 to 100 % by weight, preferably 3 to 40% by weight (calculated as $SiO_2$ and $TiO_2$) based on iron oxide particles.

The thus obtained electroconductive iron oxide particles of the present invention have an electric resistance less than $5 \times 10^6$ Ω-cm, preferably less than $5 \times 10^5$ Ω-cm, more preferably less than $5 \times 10^4$ Ω-cm. The acicular electroconductive iron oxide particles of the present invention have an average diameter of major axis of 0.1 to 3.0μm, preferably 0.2 to 3.0μm, more preferably 0.3 to 0.7 μm. The cubic or spherical electroconductive iron oxide particles of the present invention have an average diameter of 0.05 to 5.0 μm, preferably 0.1 to 5.0 μm, more preferably 0.2 to 1.0 μm. The plate-like electro-conductive hematite particles of the present invention are ones having an average diameter of 0.5 to 100 μm, a thickness of 0.005 to 15 μm, and an aspect ratio of 2:1 to 500:1.

Especially, the plate-like electroconductive hematite particles of the present invention having an average diameter of 0.5 to 5.0 μm, a thickness of 50 to 500 Å and an aspect ratio of 50:1 to 500:1, assume a golden yellow color which gives a sense of high grade.

The electroconductive iron oxide particles according to the present invention have excellent stability and electroconductivity owing to the facts that the $SnO_2$ particles containing Sb as a solid solution are deposited on the surfaces of the iron oxide particles selected from hematite and maghemite and a volume resistivity of the iron oxide particle having $SnO_2$ particles containing Sb as a solid solution is not more than $5 \times 10^6$ Ω-cm, and further the electroconductive iron oxide particles of the present invention assume a beautiful chromatic color such as reddish to dark purple, golden yellow and liver brown, so that they can be ideally used as an antistatic material.

Also, the electroconductive iron oxide particles of the present invention in which the $SnO_2$ particles containing Sb as a solid solution are deposited on the surface of the Si-, Ti- or both Si- and Ti-containing oxide layer coated on the surfaces of iron oxide particles selected from hematite and maghemite and which have a volume resistivity less than $5 \times 10^5$ Ω-cm are excellent in stability and electroconductivity and have a beautiful chromatic color such as mentioned above, so that these particles are suited for use as an antistatic material.

The present invention is explained in more detail in the following Examples; however, it should be recognized that the scope of the present invention is not restricted to these Examples.

The average diameter of the particles shown in the following Examples and Comparative Examples is the average of the diameters determined from the electron micrographs.

The L* value (lightness), a* value and b* value were those determined by subjecting the respective samples to a colorimetry in a Hunter's Lab space by using a color machine CM-1500-A (made by Color Machine Co., Ltd.) and indicated according to the (L*, a*, b*) uniform sensory color space by the Commission International de l'Eclairage (CIE), 1976. Hue and saturation were determined at $\theta = \tan^{-1} b^*/a^*$ and $C^*ab = \sqrt{a^{*2} + b^{*2}}$, respectively.

Each sample for measurement was prepared by mixing and kneading 0.5 g of iron oxide particles and 1.0 cc of castor oil by a Huber muller to form a paste, adding 4.5 g of clear lacquer to this paste and kneading them into coating material, and applying this coating material onto a cast coated paper by using a 6 mil applicator.

Volume resistivity was determined by leaving the sample particles under the conditions of 25° C. and 60% RH for 24 hours to stabilize them, then placing said particles between a pair of stainless electrodes to form a columnar test piece having an area of 2.57 cm² and a thickness of 2 mm, applying thereto a load of 1.2 kg so that the load pressure of said test piece portion would become 0.47 kg/cm², measuring the electric resistance between said pair of stainless electrodes by a Wheatstone Bridge Model 2768 (made by Yokogawa Hokushin Electric Co., Ltd.), and determining the volume resistivity (Ω) from the measured value of electric resistance according to the following formula:

ρ(volume resistivity)

$$\rho(\text{volume resistance}) = \frac{R(\Omega) \times S(cm^2)}{d(cm)}$$

R: measured electric resistance (Ω)
d: distance between electrodes (cm)
S: electrode area

EXAMPLE 1

2.0 liters of an aqueous suspension containing 25 g of cubic hematite particles of sample A (average diameter: 0.3 μm, L* value: 29, hue: 40, saturation: 37, volume resistivity: $5 \times 10^8$ Ω-cm) was kept at 70° C. for 30 minutes. Then 200 ml of an isobutyl alcohol solution containing 0.1 mol of $SnCl_4$ and 0.01 mol of $SbCl_3$ was added dropwise into said aqueous suspension under stirring, followed by the addition of NaOH to adjust the pH of the suspension to 6.5. By this treatment, an Sb-containing $SnO_2$ hydrate particles were deposited on the surfaces of said cubic hematite particles.

The suspension containing the cubic hematite particles having deposited on their surfaces said Sb-containing $SnO_2$ hydrate particles was filtered, washed with water and dried in the usual ways and then calcined by heating at 500° C. for 0.5 hour.

The calcined particles had an L* value of 28, a hue of 40, a saturation of 36 and a volume resistivity of $2 \times 10^6$ Ω-cm.

The fluorescent X-ray analysis of the obtained particles showed that the amount of $SnO_2$ deposited on the surface of the particle was 56% by weight based on hematite particle and the amount of Sb was 4.8% by weight based on $SnO_2$ particles containing Sb as a solid solution.

An X-ray diffraction pattern of the hematite particle depositing $SnO_2$ particles containing Sb as a solid solution obtained in Example 1, is shown in FIG. 1. In the drawing, peak A refers to hematite and peak B refers to $SnO_2$.

EXAMPLE 2

0.5 liter of an ethanol solution containing 0.1 mol of $SnCl_4$ and 0.004 mol of $SbCl_3$ was kept at 75° C. for 10 minutes to form an Sb-containing $SnO_2$ hydrate.

Meanwhile, 1.0 liter of an aqueous suspension containing 25 g of acicular hematite particles of separately prepared sample B (average diameter (major axis): 1.0 μm, $L^*$ value: 31, hue: 41, saturation: 40, volume resistivity: $7 \times 10^8$ Ω-cm) was kept at 75° C. for 30 minutes, and then 500 ml of the previously prepared ethanol solution containing an Sb-containing $SnO_2$ hydrate particles was added dropwise into said aqueous suspension under stirring, followed by the addition of KOH for adjusting the pH of the suspension to 7.5, thereby effecting deposition of the Sb-containing $SnO2$ hydrate particles on the surfaces of said acicular hematite particles.

Then said suspension containing the acicular hematite particles having deposited on their surfaces said Sb-containing $SnO_2$ hydrate particles was filtered, washed with water and dried by the conventional methods and then calcined at 600° C. for 2.0 hours.

The calcined particles had an $L^*$ value of 30, a hue of 40, a saturation of 39 and a volume resistivity of $8 \times 10^5$ Ω-cm.

The fluorescent X-ray analysis of the obtained particles showed that the amount of $SnO_2$ deposited on the surfaces of the particles was 54.0% by weight based on hematite particle and the amount of Sb was 2.0% by weight based on $SnO_2$ particles containing Sb as a solid solution.

From the result of X-ray diffraction which showed only the peaks due to hematite and $SnO_2$, it was noted that Sb was contained in $SnO_2$ particle as a solid solution.

EXAMPLE 3-5:

The iron oxide particles depositing $Sno_2$ particles containing Sb as a solid solution were obtained in the same way as Example 1 except that the type of sample, amount of Sn compound, amount of Sb compound, method and temperature of hydrolysis, and the temperature and time of heat treatment were changed. The main production conditions and the product properties are shown in Tables 1 and 2.

The results of X-ray diffraction of the iron oxide particles depositing $SnO_2$ particles containing Sb as a solid solution, obtained in Examples 3 to 5, showed only the peaks attributable to hematite or maghemite and $SnO_2$, from which it was noted that Sb was contained in $SnO_2$ particle as a solid solution.

TABLE 1

| | Iron oxide particles | | | | | | |
|---|---|---|---|---|---|---|---|
| | | | Average diameter | Volume resistivity | Color | | |
| Sample | Type | Shape | (μm) | (Ω-cm) | $L^*$ | Hue | Saturation |
| A | Hematite | Cubic | 0.3 | $5 \times 10^8$ | 29 | 40 | 37 |
| B | " | Acicular | (major axis) 1.0 | $7 \times 10^8$ | 31 | 41 | 40 |
| C | " | Spherical | 0.6 | $2 \times 10^8$ | 24 | 33 | 27 |
| D | Maghemite | " | 0.5 | $1 \times 10^8$ | 35 | 47 | 33 |
| E | " | Acicular | (major axis) 0.7 | $2 \times 10^8$ | 40 | 67 | 31 |

TABLE 2

| Example | Type of sample | Deposition of Sb-containing SnO₂ hydrate | | | | Hydrolysis | | Deposition of SnO₂ particles containing Sb as a solid solution Heat treatment | | Iron oxide particles depositing SnO₂ particles containing Sb as a solid solution | | | | | |
|---|---|---|---|---|---|---|---|---|---|---|---|---|---|---|---|
| | | Sn compound | | Sb compound | | Method | Temp. (°C.) | Temp. (°C.) | Time (hr) | SnO₂/ Fe₂O₃ (wt %) | Sb/ Fe₂O₃ (wt %) | Volume resistivity (Ω-cm) | L* | Hue | Saturation |
| | | Kind | Amount (mol) | Kind | Amount (mol) | | | | | | | | | | |
| 1 | Sample A | SnCl₄ | 0.1 | SbCl₃ | 0.01 | Y | 70 | 500 | 0.5 | 56 | 4.8 | 2 × 10⁶ | 28 | 40 | 36 |
| 2 | Sample B | SnCl₄ | 0.1 | SbCl₃ | 0.004 | X | 75 | 600 | 2.0 | 54 | 2.0 | 8 × 10⁵ | 30 | 40 | 39 |
| 3 | Sample C | SnCl₄ | 0.15 | SbCl₃ | 0.02 | Y | 80 | 650 | 2.0 | 81 | 9.6 | 7 × 10⁵ | 23 | 32 | 25 |
| 4 | Sample D | SnCl₄ | 0.2 | SbCl₃ | 0.02 | Y | 70 | 450 | 1.0 | 112 | 9.6 | 8 × 10⁵ | 34 | 45 | 31 |
| 5 | Sample E | SnCl₄ | 0.25 | SbCl₃ | 0.02 | Y | 75 | 500 | 1.0 | 140 | 9.6 | 6 × 10⁵ | 39 | 65 | 30 |

Method of hydrolysis:
Method X: An alcohol solution containing the Sb-containing SnO₂ hydrate particles was added to a suspension containing the iron oxide particles.
Method Y: An alcohol solution containing tin chloride and antimony chloride was added to an aqueous suspension containing iron oxide particles and maintained at 70° C. or higher.

EXAMPLE 6:

2.0 liters of an aqueous suspension containing 50 g of plate-like hematite particles of sample F (average diameter=2.4 μm, thickness =0.018 μm, aspect ratio=133:1, $L^*=44.9$, hue=64.5, saturation=27.5, volume resistivity=$2.0 \times 10^7$ Ω-cm) was kept at 70° C. for 30 minutes, and then 200 ml of an isobutyl alcohol solution containing 0.1 mol of $SnCl_4$ and 0.01 mol of $SbCl_3$ was added dropwise to said aqueous suspension under stirring, followed by the addition of NaOH to adjust the pH of the suspension to 6.5, thereby effecting deposition of the Sb-containing $SnO_2$ hydrate particle on the surfaces of said plate-like hematite particles.

The suspension containing the plate hematite particles having deposited on their surfaces said Sb-containing $SnO_2$ hydrate particles was filtered, washed with water and dried in the usual ways and then calcined at 500° C. for 0.5 hour.

The calcined particles had a golden yellow color ($L^*=44.3$, hue=56.3, saturation=27.6) and a volume resistivity of $8 \times 10^5$ Ω-cm.

The results of X-ray analysis showed that the amount of $SnO_2$ deposited on the surfaces of the particles was 28% by weight based on hematite particles and the amount of Sb was 2.4% by weight based on $SnO_2$ particles containing Sb as a solid solution.

From the result of X-ray diffraction which showed only the peaks due to hematite and $SnO_2$, it was noted that Sb was contained in $SnO_2$ particle as a solid solution.

EXAMPLE 7:

0.5 liter of an ethanol solution containing 0.1 mol of $SnCl_4$ and 0.004 mol of $SbCl_3$ was kept at 75° C. for 10 minutes to form an Sb-containing $SnO_2$ hydrate.

Meanwhile, 1.0 liter of an aqueous suspension containing 50 g of plate-like hematite particles of separately prepared sample G (average diameter=7.0 μm, thickness=0.15 μm, aspect ratio=47:1, $L^*=21.7$, hue=16.7, saturation=13.2, volume resistivity=$8 \times 10^8$ Ω-cm) was kept at 75° C. for 30 minutes, and 500 ml of the previously prepared ethanol solution containing an Sb-containing $SnO_2$ hydrate particles was added dropwise into said aqueous suspension, followed by the addition of KOH for adjusting the pH of the suspension to 7.5, causing deposition of the Sb-containing $SnO_2$ hydrate on the surfaces of said plate hematite particles.

The suspension containing the plate hematite particles having deposited on their surfaces said Sb-containing $SnO_2$ hydrate particles was filtered, washed with water and dried by the conventional methods and then calcined at 600° C. for 2.0 hours.

The calcined particles assumed a reddish purple color ($L^*=21.7$, hue=16.7, saturation=13.2) and a volume resistivity of $1 \times 10^5$ Ω-cm.

The results of fluorescent X-ray analysis of the obtained particles showed the amount of $SnO_2$ deposited on the surface of the particle was 27.0% by weight based on hematite particle, and the amount of Sb was 1.0% by weight based on $SnO_2$ particles containing Sb as a solid solution.

From the result of X-ray diffraction which showed only the peaks attributable to hematite and $SnO_2$, it was seen that Sb was contained in $SnO_2$ particle as a solid solution.

EXAMPLES 8-10

There were obtained the plate-like hematite particles depositing $SnO_2$ particles containing Sb as a solid solution in the same way as Example 6 except that the type of sample, amount of Sn compound, amount of Sb compound, method and temperature of hydrolysis, and the temperature and time of heat treatment were changed. The main producing conditions and the properties of the obtained particles are shown in Tables 3 and 4.

X-ray diffraction of the plate-like hematite particles depositing $SnO_2$ particles containing Sb as a solid solution, obtained in Examples 8 to 10, showed only the peaks due to hematite and $SnO_2$, reflecting the fact that Sb was contained in $SnO_2$ as a solid solution.

Figure 2:
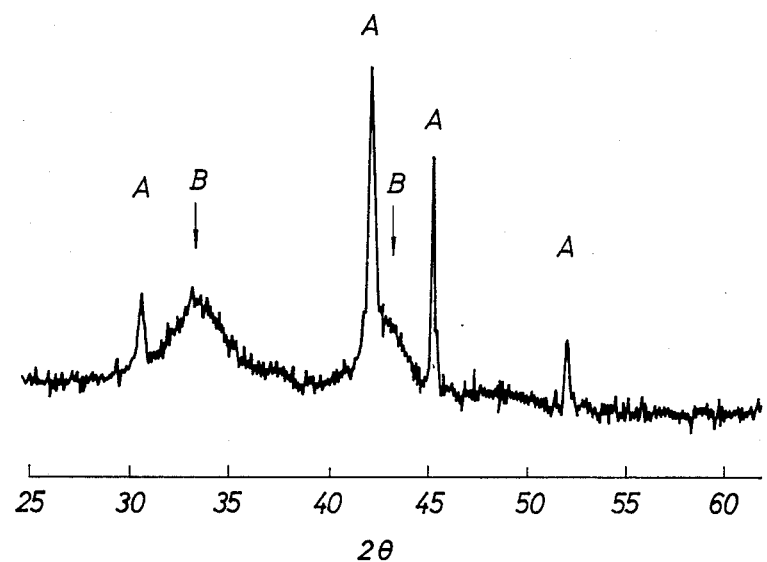
FIG. 2 is an X-ray diffraction pattern of a plate-like hematite particle depositing $SnO_2$ particles containing Sb as a solid solution phase, obtained in Example 9. In the diffraction pattern, peak A indicates hematite, and peak B indicates $SnO_2$.

An X-ray difraction pattern of the plate-like hematite particle depositing $SnO_2$ particles containing Sb as a solid solution, obtained in Example 9, is shown in FIG. 2. In the diffraction pattern, peak A refers to hematite and peak B is associated with $SnO_2$.

TABLE 3

| | | Properties of plate-like hematite particles | | | | | | | | |
|---|---|---|---|---|---|---|---|---|---|---|
| | | Shape of particle | | | | Volume resistivity (Ω-cm) | Color | | | |
| Sample | Producing conditions | Surface diameter (μm) | Thickness (μm) | Aspect ratio | BET (m²/g) | | $L^*$ | Hue | Saturation | Remarks |
| F | Synthetic iron oxide | 2.4 | 0.018 | 133:1 | 16.1 | $2 \times 10^7$ | 44.9 | 64.5 | 27.5 | Golden yellow |
| G | Synthetic iron oxide | 7.0 | 0.15 | 47:1 | 1.0 | $8 \times 10^8$ | 21.7 | 16.7 | 13.2 | Reddish purple |
| H | Natural iron oxide | 40 | 1.33 | 30:1 | 0.33 | $4 \times 10^8$ | * | * | * | Dark purple |
| I | synthetic iron oxide | 2.4 | 0.038 | 63:1 | 10.9 | $3 \times 10^7$ | 47.3 | 63.2 | 24.1 | Golden yellow |
| J | synthetic iron oxide | 1.2 | 0.32 | 4:1 | 2.0 | $3 \times 10^8$ | 19.3 | 13.1 | 13.0 | Reddish purple |

*Unable to measure as breaks occurred during kneading by Hoover muller.

TABLE 4

| Example | Type of sample | Deposition of Sb-containing SnO₂ hydrate | | | | Hydrolysis | | Deposition of SnO₂ particles containing Sb as a solid solution Heat treatment | | Plate-like hematite particles depositing SnO₂ particles containing Sb as a solid solution | | | | | |
|---|---|---|---|---|---|---|---|---|---|---|---|---|---|---|---|
| | | Sn compound | | Sb compound | | | | | | | | Volume | | | |
| | | Kind | Amount (mol) | Kind | Amount (mol) | Method | Temp. (°C.) | Temp. (°C.) | Time (hr) | $SnO_2/Fe_2O_3$ (wt %) | $Sb/Fe_2O_3$ (wt %) | resistivity (Ω-cm) | L* | Hue | Saturation |
| 6 | Sample F | SnCl₄ | 0.1 | SbCl₃ | 0.01 | Y | 70 | 500 | 0.5 | 28 | 2.4 | 8 × 10⁵ | 44.3 | 56.3 | 27.6 |
| 7 | Sample G | SnCl₄ | 0.1 | SbCl₃ | 0.004 | X | 75 | 600 | 2.0 | 27 | 1.0 | 1 × 10⁵ | 21.7 | 16.7 | 13.2 |
| 8 | Sample H | SnCl₄ | 0.1 | SbCl₃ | 0.012 | Y | 70 | 650 | 1.0 | 26 | 3.0 | 5 × 10⁴ | * | * | * |
| 9 | Sample I | SnCl₄ | 0.3 | SbCl₃ | 0.03 | X | 70 | 450 | 0.5 | 85 | 7.3 | 3 × 10⁴ | 47.5 | 63.1 | 24.0 |
| 10 | Sample J | SnCl₄ | 0.05 | SbCl₃ | 0.004 | Y | 70 | 700 | 1.0 | 9 | 1.0 | 3 × 10⁵ | 19.4 | 13.0 | 13.1 |

Method of hydrolysis
Method X: An alcohol solution containing the Sb-containing SnO₂ hydrate particles was added to a suspension containing the plate hematite particles.
Method Y: An alcohol solution containing tin chloride and antimony chloride was added to an aqueous suspension containing plate hematite particles and maintained at 70° C. or above.

EXAMPLE 11:

To 2.0 liters of an aqueous suspension containing 25 g of cubic hematite particles of sample K (average diameter=0.2 μm, L*=34, hue=47, saturation=44, volume resistivity=$4 \times 10^8$ Ω-cm) was added 8.8 g (corresponding to 10.0% by weight based on hematite particles) of #3 water glass ($SiO_2$: 28.55% by weight). The suspension was stirred for mixing it up and then added with hydrochloric acid to adjust the suspension pH to 7.0, thereby causing formation of an $SiO_2$ layer on the surfaces of said cubic hematite particles.

A part of said suspension was filtered, washed with water and dried in the usual ways. Fluorescent X-ray analysis of the thus obtained cubic hematite particles showed that the amount of $SiO_2$ formed on the surfaces of the particles was 9.7% by weight based on cubic hematite particles.

The aqueous suspension containing the cubic hematite particles having formed on their surfaces an $SiO_2$ layer was kept at 70° C. for 30 minutes, and then 200 ml of an isobutyl alcohol solution containing 0.1 mol of $SnCl_4$ and 0.01 mol of $SbCl_3$ was added dropwise into said aqueous suspension under stirring, followed by the addition of NaOH for adjusting the suspension pH to 6.5, thereby causing deposition of the Sb-containing $SnO_2$ hydrate particles on the surface of said $SiO_2$ layer.

The suspension containing the cubic hematite particles coated with an $SiO_2$ layer having deposited on its surface the Sb-containing $SnO_2$ hydrate particles was filtered, washed with water and dried according to the conventional methods and then calcined at 550° C. for 1.0 hour.

The calcined particles showed an L* value of 33, a hue of 46, a saturation of 43 and a volume resistivity of $3 \times 10^5$ Ω-cm.

Fluorescent X-ray analysis of the obtained particles showed that the amount of $SnO_2$ deposited on the surfaces of the particles was 58.0% by weight based on hematite particles, and the amount of Sb was 4.8% by weight based on $SnO_2$ particles containing Sb as a solid solution.

From the result of X-ray diffraction which showed only the peaks associated with hematite and $SnO_2$, it was noted that Sb was contained in $SnO_2$ particle as a solid solution.

EXAMPLE 12:

To 2.0 liters of an aqueous suspension containing 25 g of cubic hematite particles of sample K (average diameter=0.2 μm, L*=34, hue=47, saturation=44, volume resistivity=$4 \times 10^8$ Ω-cm) was added 12.3 g (corresponding to 20.0% by weight based on hematite particles) of titanyl sulfate. The solution was stirred, then heated and kept at 95° C. for 60 minutes, followed by the addition of hydrochloric acid to adjust the pH to 7.0, thereby causing formation of a $TiO_2$ hydrate layer on the surface of each said cubic hematite particle.

A part of said suspension was filtered, washed with water and dried by the ordinary methods. Fluorescent X-ray analysis of the thus obtained cubic hematite particles showed that the amount of $TiO_2$ in the $TiO_2$ hydrate formed on the surfaces of the particles was 19.8% by weight (calculated as $TiO_2$) based on cubic hematite particles.

Separately, 0.5 liter of an ethanol solution containing 0.1 mol of $SnCl_4$ and 0.004 mol of $SbCl_3$ was kept at 75° C. for 10 minutes to form the Sb-containing $SnO_2$ hydrate particles.

Said ethanol solution containing the Sb-containing $SnO_2$ hydrate particles was added dropwise into the previously prepared aqueous suspension containing the cubic hematite particles having formed on their surfaces a $TiO_2$ hydrate layer while stirring said suspension, followed by the addition of KOH to adjust the suspension pH to 7.5, thereby causing deposition of the Sb-containing $SnO_2$ hydrate particles on the surface of said $TiO_2$ hydrate layer.

The suspension containing the cubic hematite particles having deposited on their surfaces the Sb-containing $SnO_2$ hydrate particles was filtered, washed with water and dried according to the conventional methods and then calcined at 600° C. for 2.0 hours. The calcined particles showed an L* value of 33, a hue of 48, a saturation of 43 and a volume resistivity of $4 \times 10^5$ Ω-cm.

Fluorescent X-ray analysis of the obtained particles showed that the amount of $SnO_2$ deposited on the surfaces of the particles was 56.0% by weight based on hematite particles and the amount of Sb was 2.0% by weight based on $SnO_2$ particles containing Sb as a solid solution.

From the result of X-ray diffraction which showed only the peaks linked with hematite and $SnO_2$, it was noted that Sb was containined in $SnO_2$ as a solid solution.

EXAMPLES 13–17

The iron oxide particles having deposited on their Si- or Ti-containing or both Si- and Ti-containing oxide layer the $SnO_2$ particles containing Sb as a solid solution were obtained by following the same procedure as Example 11 except that the type of sample, kind and amount of Si-containing compound, kind and amount of Ti-containing compound, amount of Sn compound, amount of Sb compound, method and temperature of hydrolysis, and temperature and time of heat treatment were changed.

The main producing conditions and the properties of the obtained particles are shown in Tables 5 and 7.

X-ray diffraction of the iron oxide particles obtained in Examples 13 to 17 showed only the peaks associated with hematite or magnemite and $SnO_2$, indicating that Sb was contained in $SnO_2$ as a solid solution.

TABLE 5

| | | | Iron oxide particles | | | | |
| --- | --- | --- | --- | --- | --- | --- | --- |
| | | | Average diameter | Volume resistivity | Color | | |
| Sample | Kind | Shape | (μm) | (Ω-cm) | L* | Hue | Saturation |
| K | Hematite | Cubic | 0.2 | $4 \times 10^8$ | 34 | 47 | 44 |
| L | " | acicular | 1.0 (major axis) | $7 \times 10^8$ | 31 | 41 | 40 |
| M | " | spherical | 0.6 | $2 \times 10^8$ | 24 | 33 | 27 |
| N | Maghemite | spherical | 0.5 | $1 \times 10^8$ | 35 | 47 | 33 |
| O | " | acicular | 0.7 (major | $2 \times 10^8$ | 40 | 67 | 31 |

TABLE 5-continued

| | | | Iron oxide particles | | | | |
|---|---|---|---|---|---|---|---|
| | | | Average diameter | Volume resistivity | | Color | |
| Sample | Kind | Shape | (μm) axis) | (Ω-cm) | L* | Hue | Saturation |

TABLE 6

| | Type of plate-like hematite particle | Formation of oxide, hydroxide or hydrate layer containing Si or Ti or both of them | | | | | | Deposition of Sb-containing SnO₂ hydrate solution | | | | | | Deposition of SnO₂ particles containing Sb as a solid | | |
|---|---|---|---|---|---|---|---|---|---|---|---|---|---|---|---|---|
| | | Si-containing compound | | | Ti-containing compound | | | | Sn compound | | Sb compound | | Hydrolysis | | Heat treatment | |
| Examples | | pH | Kind | Amount SiO₂/ Fe₂O₃ (wt %) | Kind | Amount TiO₂/ Fe₂O₃ (wt %) | De-posi-tion of Sb-containing pH | | Kind | Amount (mol) | Kind | Amount (mol) | Method | Temp. (°C.) | Temp. (°C.) | Time (hr) |
| Example 11 | K | 7 | #3 water glass | 10.0 | — | — | — | | SnCl₄ | 0.1 | SbCl₃ | 0.01 | Y | 70 | 550 | 1.0 |
| Example 12 | K | — | — | — | Titanyl sulfate | 20.0 | 7.0 | | SnCl₄ | 0.1 | SbCl₃ | 0.004 | X | 75 | 600 | 2.0 |
| Example 13 | L | 6 | #3 water glass | 5.0 | Titanium tetra-chloride | 5.0 | 5.9 | | SnCl₄ | 0.15 | SbCl₃ | 0.01 | Y | 80 | 650 | 0.5 |
| Example 14 | M | — | — | — | Titanyl sulfate | 10.0 | 7.0 | | SnCl₄ | 0.2 | SbCl₃ | 0.02 | Y | 75 | 500 | 1.0 |
| Example 15 | N | 6 | Colloidal silica | 5.0 | — | — | — | | SnCl₄ | 0.1 | SbCl₃ | 0.004 | X | 70 | 450 | 0.5 |
| Example 16 | N | — | — | — | Titanium tetra-chloride | 5.0 | 7.0 | | SnCl₄ | 0.15 | SbCl₃ | 0.01 | X | 70 | 500 | 1.0 |
| Example 17 | O | 7 | #3 water glass | 10.0 | — | — | — | | SnCl₄ | 0.15 | SbCl₃ | 0.01 | Y | 75 | 500 | 2.0 |

Method of hydrolysis
Method X: An alcohol solution containing the Sb-containing SnO₂ hydrate particles was added to a suspension containing the iron oxide particles.
Method Y: An alcohol solution containing tin chloride and antimony chloride was added to an aqueous suspension containing iron oxide particles and maintained at 70° C. or higher.

TABLE 7

| | Iron oxide particles having deposited on their specific oxide layer the SnO₂ particles containing Sb as a solid solution | | | | | | | |
|---|---|---|---|---|---|---|---|---|
| Examples | SiO₂/ Fe₂O₃ (wt %) | TiO₂/ Fe₂O₃ (wt %) | SnO₂/ Fe₂O₃ (wt %) | Sb/ Fe₂O₃ (wt %) | Volume resistivity (Ω-cm) | L* | Hue | Saturation |
| Example 11 | 9.7 | — | 58 | 4.8 | $3 \times 10^5$ | 33 | 46 | 43 |
| 12 | — | 19.8 | 56 | 2.0 | $4 \times 10^5$ | 33 | 48 | 43 |
| 13 | 4.5 | 4.8 | 81 | 4.8 | $2 \times 10^5$ | 30 | 40 | 39 |
| 14 | — | 9.8 | 112 | 9.6 | $7 \times 10^4$ | 23 | 32 | 26 |
| 15 | 4.0 | — | 58 | 2.0 | $4 \times 10^5$ | 34 | 46 | 32 |
| 16 | — | 4.7 | 81 | 4.8 | $3 \times 10^5$ | 34 | 45 | 31 |
| 17 | 9.6 | — | 81 | 4.8 | $2 \times 10^5$ | 39 | 65 | 30 |

EXAMPLE 18:

To 2.0 liters of an aqueous suspension with a PH of 12.5 containing 50 g of plate-like hematite particles of sample P (average diameter=2.4 μm, thickness=0.018 μm, aspect ratio=133:1, L*=44.9, hue=64.5, saturation=27.5, volume resistivity=$2.0 \times 10^7$ Ω-cm) was added 17.5 g (corresponding to 10.0% by weight based on hematite particles) of #3 water glass (SiO₂: 28.55% by weight). The solution was stirred and added with hydrochloric acid to adjust its pH to 7.0, thereby causing formation of an SiO₂ layer on the surface of each hematite particle.

A part of said suspension was filtered, washed with water and dried by the conventional methods. Fluorescent X-ray analysis of the obtained plate-like hematite particles showed that the amount of SiO₂ formed on the surfaces of the particles was 9.7% by weight based on plate-like hematite particles.

Said aqueous suspension containing the plate-like hematite particles having an SiO₂ layer formed on their surfaces was kept at 70° C. for 30 minutes, and then 200 ml of an isobutyl alcohol solution containing 0.1 mol of SnCl₄ and 0.01 mol of SbCl₃ was added dropwise into said aqueous suspension under stirring, followed by the addition of NaOH to adjust the solution pH to 6.5, thereby causing deposition of the Sb-containing SnO₂ hydrate particles on the surface of said SiO₂ layer.

The suspension containing the plate-like hematite particles coated with said SiO₂ layer having deposited on its surface the Sb-containing SnO₂ hydrate particles was filtered, washed with water and dried by the conventional methods and then calcined at 550° C. for 1.0 hour.

The calcined particles assumed a golden yellow color (L*=44.0, hue=55.8, saturation=27.0) and had a volume resistivity of $2 \times 10^5$ Ω-cm.

Fluorescent X-ray analysis of the obtained particles showed that the amount of SnO₂ deposited on the surfaces of the particles was 29.0% by weight based on hematite particles, and the amount of Sb was 2.4% by weight based on SnO₂ particles containing Sb as a solid solution.

X-ray diffraction of the particle showed only the peaks of hematite and SnO₂, indicating that Sb was contained in SnO₂ as a solid solution.

EXAMPLE 19:

To 2.0 liters of an aqueous suspension containing 50 g of plate-like hematite particles of sample P (average diameter=2.4 μm, thickness=0.018 μm, aspect ratio=133:1, L*=44.9, hue=64.5, saturation=27.5, volume resistivity=$2.0 \times 10^7$ Ω-cm) was added 24.5 g of titanyl sulfate (corresponding to 20.0% by weight based on hematite particle). The solution was stirred, heated and kept at 95° C. for 60 minutes, followed by the addition of hydrochloric acid to adjust the suspension pH to 7.0, thereby causing formation of a TiO₂ hydrate layer on the surface of the particle.

A part of said suspension was filtered, washed with water and dried by the conventional methods. Fluorescent X-ray analysis of the obtained particles showed that the amount of TiO₂ in the TiO₂ hydrate formed on the surfaces of the particles was 19.8% by weight (calculated as TiO₂) based on plate-like hematite particles.

There was separately prepared 0.5 liter of an ethanol solution containing 0.1 mol of SnCl₄ and 0.004 mol of SbCl₃, and this solution was kept at 75° C. for 10 minutes to form the Sb-containing SnO₂ hydrate particles.

500 ml of said ethanol solution was added dropwise to the previously prepared aqueous suspension containing the plate-like hematite particles having formed on their surface a TiO₂ hydrate layer while stirring said suspension, followed by the addition of KOH to adjust the pH to 7.5, thus effecting deposition of the Sb-containing SnO₂ hydrate particles on the surface of said TiO₂ hydrate layer.

Said suspension containing the plate-like hematite particles having deposited on their surfaces the Sb-containing SnO₂ hydrate particles was filtered, washed with water and dried by the conventional methods and then calcined at 600° C. for 2.0 hours.

The calcined particles assumed a golden yellow color (L*=43.0, hue=53.4, saturation=26.0) and had a volume resistivity of $3 \times 10^5$ Ω-cm. Fluorescent X-ray analysis of the obtained particles showed that the amount of SnO₂ deposited on the surfaces of the particles was 28.0% by weight based on hematite particles, and the amount of Sb was 1.0% by weight based on SnO₂ particles containing Sb as a solid solution.

From the result of X-ray diffraction which showed only the peaks of hematite and SnO₂, it was noted that Sn was contained in SnO₂ as a solid solution.

EXAMPLES 20-24

There were obtained the plate-like hematite particles having the SnO₂ particles containing Sb as a solid solution deposited on the Si- or Ti-containing or both Si and Ti-containing oxide layer surface by following the same procedure as Example 18 except that the type of sample, kind and amount of Si-containing compound, kind and amount of Ti-containing compound, amount of Sn compound, amount of Sb compound, method and temperature of hydrolysis, and temperature and time of heat treatment were changed.

The main producing conditions and the properties of the obtained particles are shown in Tables 9 to 11.

X-ray diffraction of the plate-like hematite particles obtained in Examples 20 to 24 showed only the peaks of hematite and $SnO_2$, indicating that Sb was contained in $SnO_2$ as a solid solution.

TABLE 8

| | | Properties of plate-like hematite particles | | | | | | | | |
|---|---|---|---|---|---|---|---|---|---|---|
| | | Particle shape | | | | Volume resis- | Color | | | |
| Sample | Producing conditions | Surface diameter ($\mu$m) | Thickness ($\mu$m) | Aspect ratio | BET ($m^2/g$) | tivity ($\Omega$-cm) | L* | Hue | Saturation | Remarks |
| P | Synthetic iron oxide | 2.4 | 0.018 | 133:1 | 16.1 | $2 \times 10^7$ | 44.9 | 64.5 | 27.5 | Golden yellow |
| Q | Synthetic iron oxide | 7.0 | 0.15 | 47:1 | 1.0 | $8 \times 10^8$ | 21.7 | 16.7 | 13.2 | Reddish purple |
| R | Natural iron oxide | 40 | 1.33 | 30:1 | 0.33 | $4 \times 10^8$ | * | * | * | Dark purple |

*Unable to measure due to breaks in the course of kneading by Hoover muller.

TABLE 9

| | Type of plate-like hematite particle | \multicolumn{5}{c|}{Formation of oxide, hydroxide or hydrate layer containing Si or Ti or both of them} | \multicolumn{7}{c|}{Deposition of Sb-containing SnO₂ hydrate} | \multicolumn{2}{c|}{Deposition of SnO₂ particles containing Sb as a solid solution Heat treatment} |
|---|---|---|---|---|---|---|---|---|---|---|---|---|---|---|---|
| | | | Si-containing compound | | Ti-containing compound | | | Sn compound | | Sb compound | | Hydrolysis | | Temp. (°C.) | Time (hr) |
| Examples | | pH | Kind | Amount SiO₂/Fe₂O₃ (wt %) | Kind | Amount TiO₂/Fe₂O₃ (wt %) | pH | Kind | Amount (mol) | Kind | Amount (mol) | Method | Temp. (°C.) | | |
| Example 18 | P | 12.5 | #3 water glass | 10.0 | — | — | 7.0 | SnCl₄ | 0.1 | SbCl₃ | 0.01 | Y | 75 | 550 | 1.0 |
| Example 19 | P | — | — | — | Titanyl sulfate | 20.0 | 7.0 | SnCl₄ | 0.1 | SbCl₃ | 0.004 | X | 75 | 600 | 2.0 |
| Example 20 | P | 6 | #3 water glass | 5.0 | Titanium tetrachloride | 5.0 | 7.0 | SnCl₄ | 0.3 | SbCl₃ | 0.03 | Y | 70 | 600 | 0.5 |
| Example 21 | Q | 6 | Colloidal silica | 5.0 | — | — | — | SnCl₄ | 0.1 | SbCl₃ | 0.01 | Y | 70 | 500 | 2.0 |
| Example 22 | Q | — | — | — | Titanyl sulfate | 10.0 | 5.0 | SnCl₄ | 0.3 | SbCl₃ | 0.03 | Y | 70 | 550 | 1.5 |
| Example 23 | R | 6.5 | #3 water glass | 3.0 | — | — | — | SnCl₄ | 0.1 | SbCl₃ | 0.01 | Y | 70 | 600 | 1.0 |
| Example 24 | R | — | — | — | Titanyl sulfate | 5.0 | 5.0 | SnCl₄ | 0.1 | SbCl₃ | 0.01 | Y | 70 | 550 | 0.5 |

Method of hydrolysis:
Method X: An alcohol solution containing the Sb-containing SnO₂ hydrate particles was added to a suspension containing the plate-like hematite particles.
Method Y: An alcohol solution containing tin chloride and antimony chloride was added to an aqueous suspension containing plate-like hematite particles and maintained at 70° C. or higher.

TABLE 10

| | Plate-like hematite particles having deposited on their specific oxide layer surface the SnO$_2$ particles containing Sb as a solid solution | | | | | | | |
|---|---|---|---|---|---|---|---|---|
| Examples | SiO$_2$/ Fe$_2$O$_3$ (wt %) | TiO$_2$/ Fe$_2$O$_3$ (wt %) | SnO$_2$/ Fe$_2$O$_3$ (wt %) | Sb/ Fe$_2$O$_3$ (wt %) | Volume resistivity ($\Omega$-cm) | L* | Hue | Saturation |
| Example 18 | 9.7 | — | 29.0 | 2.4 | $2 \times 10^5$ | 44.0 | 55.8 | 27.0 |
| 19 | — | 19.8 | 28.0 | 1.0 | $3 \times 10^5$ | 43.0 | 53.4 | 26.0 |
| 20 | 4.8 | 4.8 | 83.0 | 7.5 | $4 \times 10^3$ | 43.5 | 54.1 | 26.5 |
| 21 | 4.9 | — | 28.0 | 2.5 | $6 \times 10^4$ | 21.6 | 16.8 | 13.1 |
| 22 | — | 9.5 | 30.0 | 7.4 | $8 \times 10^3$ | 21.0 | 15.8 | 12.5 |
| 23 | 2.8 | — | 25.0 | 2.5 | $8 \times 10^4$ | — | — | — |
| 24 | — | 4.8 | 28.0 | 2.4 | $7 \times 10^4$ | — | — | — |

What is claimed is:

1. Electroconductive iron oxide particles having a volume resistivity less than $5 \times 10^6$ $\Omega$-cm, and comprising iron oxide particles selected from hematite and maghemite, and SnO$_2$ particles containing Sb as a solid solution deposited on the surfaces of the iron oxide particles.

2. Electroconductive iron oxide particles according to claim 1, wherein the SnO$_2$ particle containing Sb as a solid solution is deposited in an amount of 5.0 to 200% by weight based on iron oxide particle.

3. Electroconductive iron oxide particles according to claim 1, wherein the amount of Sb in the SnO$_2$ particle containing Sb as a solid solution is 0.1 to 40.0% by weight based on SnO$_2$ particle containing Sb as a solid solution.

4. Electroconductive iron oxide particles according to claim 1, wherein the iron oxide particle is a plate-like hematite particle.

5. Electroconductive iron oxide particles according to claim 4, wherein the plate-like hematite particles have an average diameter of 0.5 to 100 μm, a thickness of 0.005 to 15 μm and an aspect ratio of 2:1 to 500:1.

6. Electroconductive iron oxide particles according to claim 4, wherein the plate-like hematite particles have an average diameter of 0.5 to 5.0 μm, a thickness of 50 to 500 Å and an aspect ratio of 50:1 to 500:1.

7. Electroconductive iron oxide particles according to claim 1 wherein the iron oxide particle is coated with a layer of an oxide of Si or Ti or both of Si and Ti.

8. Electroconductive iron oxide particles according to claim 7 having a volume resistivity less than $5 \times 10^5$ $\Omega$-cm.

9. Electroconductive iron oxide particles according to claim 7, wherein the amount of Si in the coating layer is 1 to 100% by weight (calculated as SiO$_2$) based on iron oxide particle.

10. Electroconductive iron oxide particles according to claim 7, wherein the amount of Ti in the coating layer is 1 to 100% by weight (calculated as TiO$_2$) based on iron oxide particle.

11. Electroconductive iron oxide particles according to claim 1, which are plate-like electroconductive hematite particles.

12. Electroconductive iron oxide particles according to claim 11, wherein the plate-like electroconductive hematite particles have an average diameter of 0.5 to 100 μm, a thickness of 0.005 to 15 μm and an aspect ration of 2:1 to 500:1.

13. Electroconductive iron oxide particles according to claim 11, wherein the plate-like electroconductive hematite particles have an average diameter of 0.5 to 5.0 μm, a thickness of 50 to 500 Å and an aspect ratio of 50:1 to 500:1.

14. Electroconductive iron oxide particles according to claim 13, wherein the plate-like electroconductive hematite particles have a lightness of L* of not less than 30, a hue ($\theta = \text{Tan}^{-1}$ b*/a*) of not less than 50° and a saturation C* of not less than 17.

* * * * *